INVENTOR
JOE G. RICH

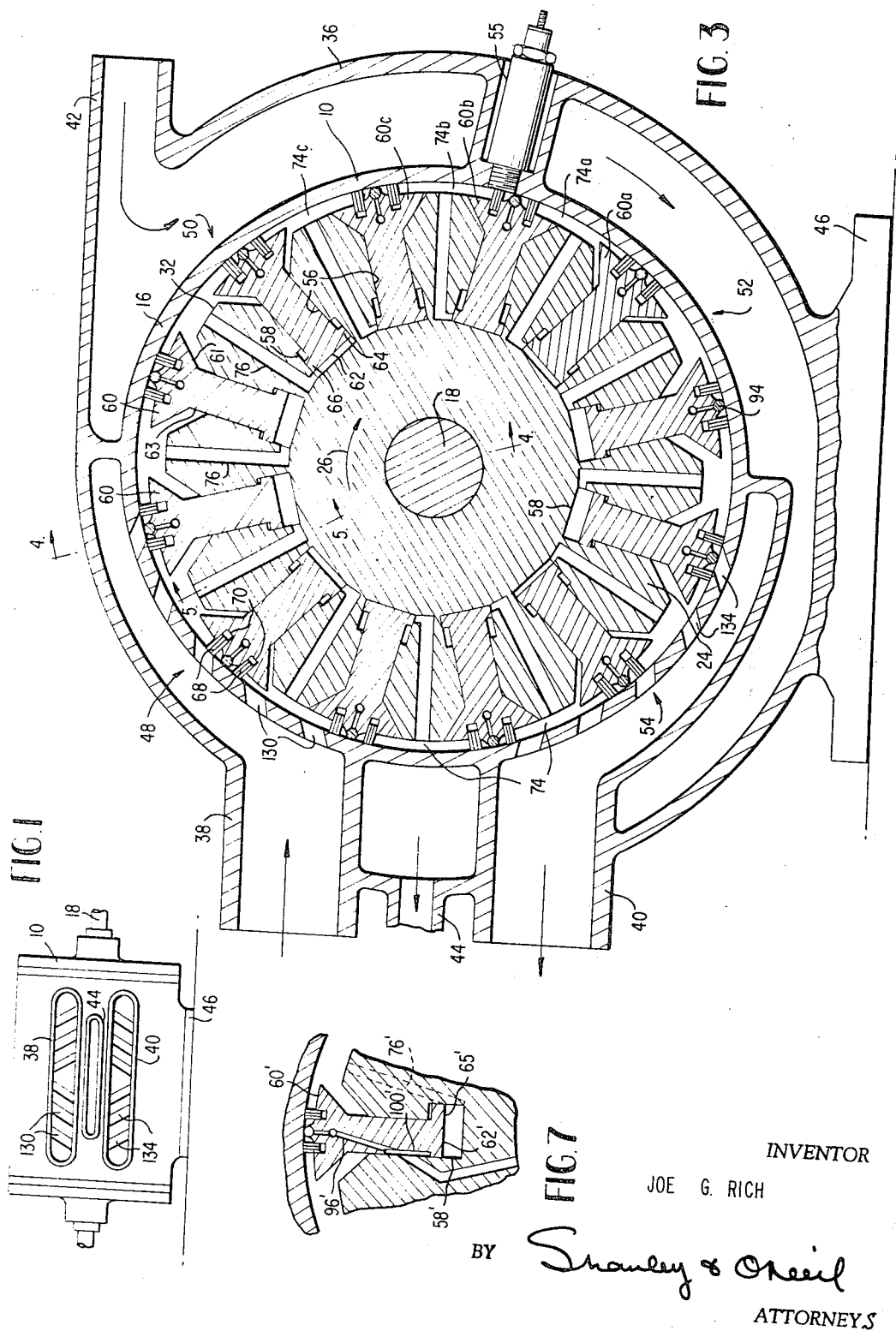
INVENTOR
JOE G. RICH
BY Shanley & O'Neil
ATTORNEYS

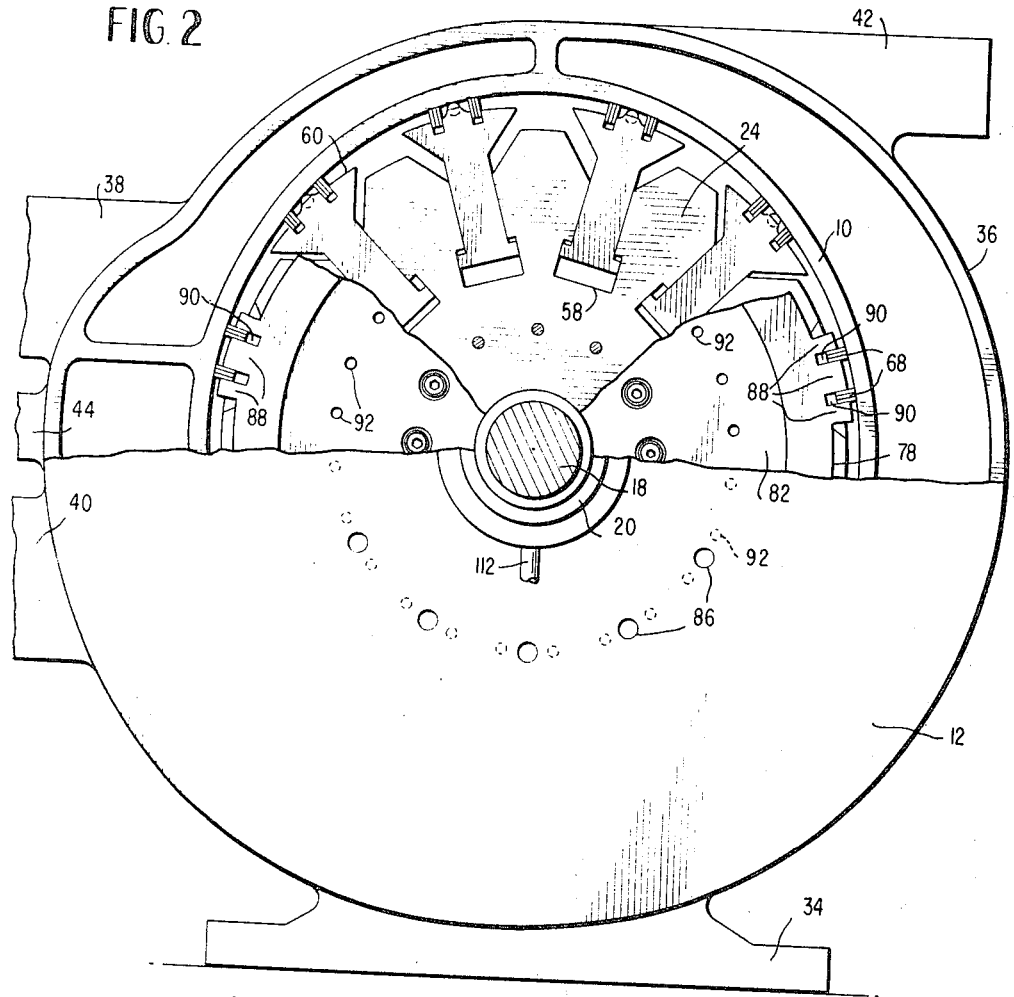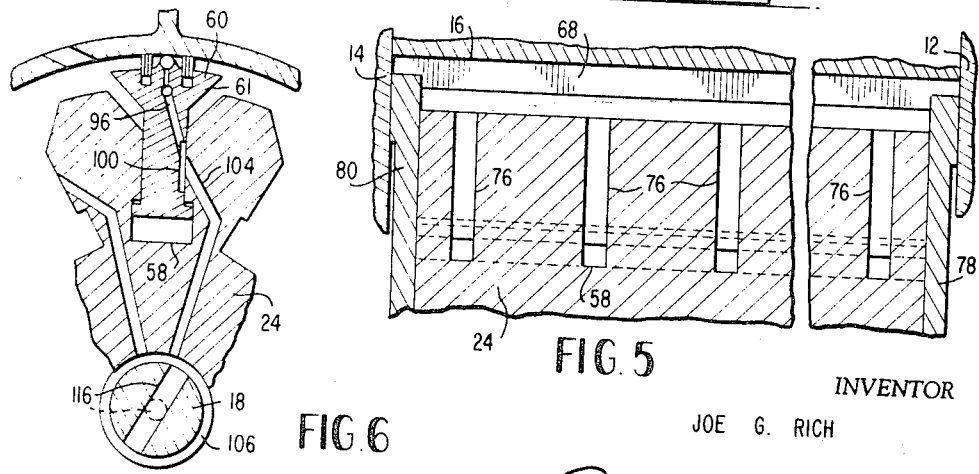

United States Patent Office 3,450,108
Patented June 17, 1969

3,450,108
ROTARY INTERNAL COMBUSTION ENGINE
Joe G. Rich, 2996 NW. 62nd St., Miami, Fla. 33147
Filed June 6, 1967, Ser. No. 644,000
Int. Cl. F02b 53/04; F01c 21/04, 19/02
U.S. Cl. 123—16
11 Claims

ABSTRACT OF THE DISCLOSURE

Rotary internal combustion engine includes a rotor mounted in a stationary housing and carrying a plurality of vanes which sealably drive a variable-volume working space between the rotor and the housing into working chambers. The vanes are radially slideable in recesses in the rotor, and passageways formed in the rotor communicate between the radially inner ends of the recesses and the adjacent working chambers. The passageways prevent formation of high radial pressure differentials across the vanes which could force the vanes radially inwardly out of sealing relation with the housing to cause leakage between adjacent chambers. In addition, the passageways make the volume of the inner ends of the recesses available for receiving charge so that the engine can achieve higher orders of compression.

Background of the invention

This invention pertains to rotary internal combustion engines of the type including a rotor mounted in a stationary housing and carrying a plurality of vane members which divide a variable-volume space between the rotor and the housing into individual working chambers.

Engines of this type previously proposed suffer from a number of disadvantages. One of these is gas leakage between adjacent working chambers, which adversely affects the power output. This gas leakage has two main sources, one of which is the failure of centrifugal force to maintain the vane members in sealing relation with the housing under the high pressures incident to firing.

Attempts have been made to prevent leakage from this source by employing springs or other mechanisms in the rotor for exerting a radially outward force on the vane members to maintain the members in sealing engagement with the housing. Such arrangements are costly and complex, subject to mechanical breakdown, and relatively inaccessible for repair.

The other leakage source relates to passage of gas around the ends of the vanes and rotor. Various proposals have also been made to eliminate this source of leakage, but a need still exists for a rotary internal combustion engine providing simple and effective solutions to the problems of leakage.

Another disadvantage of existing rotary engines relates to the inability of an engine of given size to develop the order of compression required for delivery of the amount of power desired for many applications. Hence, a need also exists for a rotary engine capable of producing relatively high compression for its size and weight.

Accordingly, an object of the invention is the provision of a rotary internal combustion engine having an improved construction for preventing gas leakage between adjacent working chambers.

Another object of the invention is the provision of an improved rotary internal combustion engine capable of producing extraordinarily high levels of compression.

Other objects of the invention, its features and advantages, will appear from the following detailed description which, when considered in connection with the accompanying drawings, discloses a preferred embodiment of the invention for purposes of illustration only and not for determination of the limits of the invention. For defining the scope of the invention, reference will be made to the appended claims.

Brief description of the drawings

In the drawings, wherein similar reference characters denote similar elements throughout the several views:

FIGURE 1 is a front elevational view of a rotary internal combustion engine forming a preferred embodiment of the invention;

FIGURE 2 is a right side view, partly in cross-section, of the engine of FIGURE 1;

FIGURE 3 is a side vertical cross-sectional view of the engine of FIGURE 1;

FIGURE 1 is a cross-sectional view taken on line 4—4 of FIGURE 3;

FIGURE 5 is a detail view taken on section line 5—5 of FIGURE 3;

FIGURE 6 is a cross-sectional detail view taken on line 6—6 of FIGURE 4; and

FIGURE 7 is a view showing a modification of the details of FIGURE 6.

Description of the preferred embodiment

Figure 4:
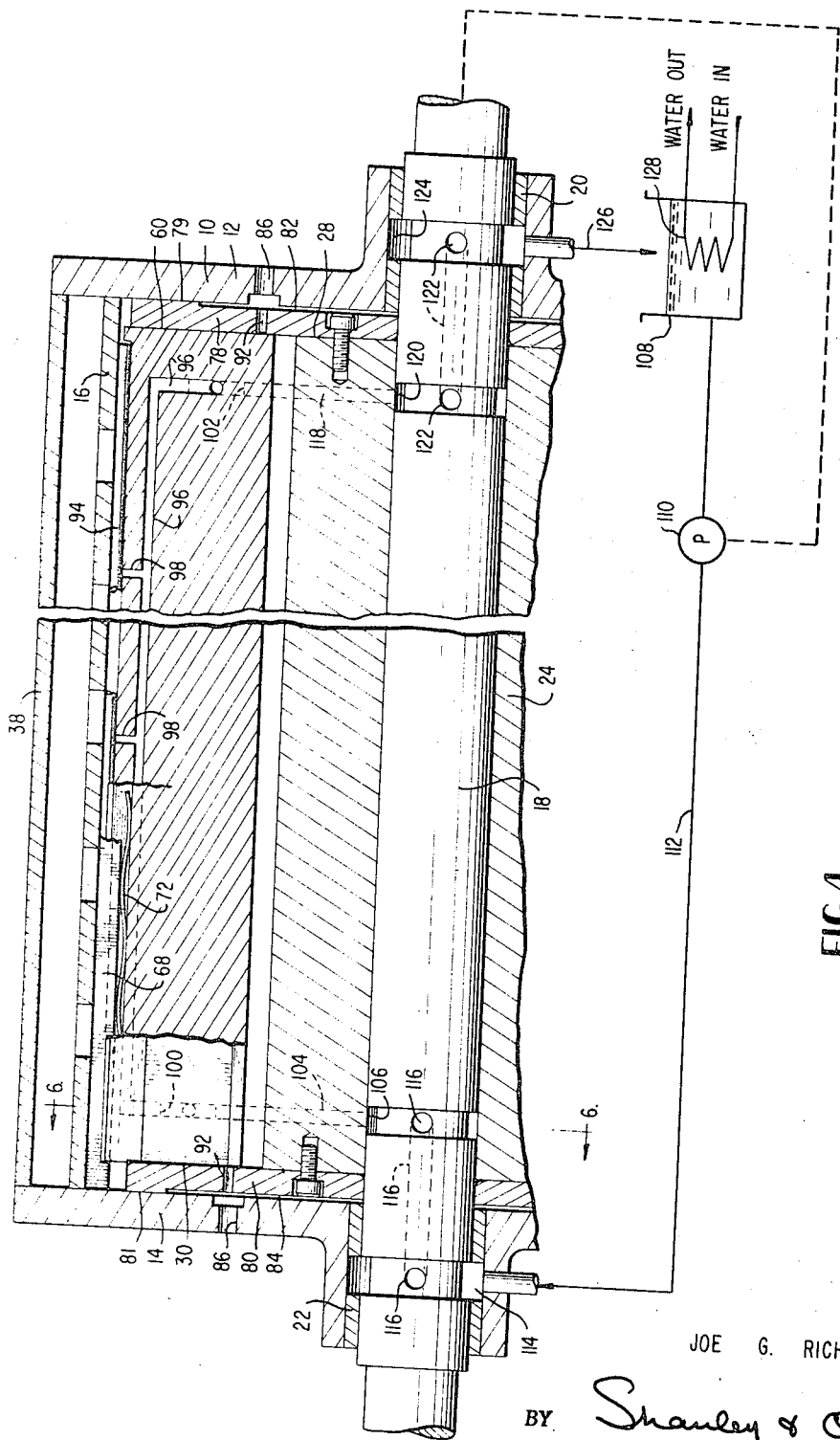

FIGURES 1, 3 and 4 illustrate a rotary internal combustion engine comprising a stationary housing 10 having opposing end walls 12, 14 and a peripheral side wall 16. A shaft 18 is mounted in bearings 20, 22 in the housing end walls 12, 14 for rotation about a longitudinal axis. A cylindrical rotor 24, fixedly secured to shaft 18, has end walls 28, 30 opposing the housing end walls 12, 14. Rotor 24 has a peripheral side surface 32 opposing peripheral wall 16 of housing 10, and rotates in the direction of arrow 26.

A water cooling jacket 36 surrounds the peripheral wall 16 of housing 10 except at the regions of the engine intake manifold 38 and exhaust manifold 40. Coolant enters jacket 36 in conduit 42 and passes in a counterclockwise direction around housing wall 16 and the ends of the intake and exhaust manifolds to emerge through discharge conduit 44. The housing 10 and cooling jacket 36 are carried by a suitable base 46.

Rotor 24 is concentrically arranged relative to housing 10, and is generally circular in cross section. Housing 10 is generally elliptical in cross-section, with the long axis of the ellipse extending vertically in the drawing. By this arrangement, rotor surface 32 and housing 10 define between them a working space which varies in volume circumferentially around the rotor. The volume of the working space varies cyclically, increasing in intake region or quadrant 48, decreasing in compression region 50, increasing in combustion region 52, and decreasing in exhaust region 54. The regions are thus serially disposed around the peripheral surface of the rotor, and an igniting device 55 is mounted in housing 10 at the junction of compression region 50 and combustion region 52.

A plurality of recesses 56 are formed in rotor 24. Recesses 56 extend radially inwardly from peripheral surface 32 of the rotor and are spaced from one another circumferentially around the rotor. An enlarged chamber 58 is formed at the radially inner end of each recess and provides additional volume for charge intake so that the order of compression achieved in the engine can be increased without an increase in the size of the engine.

A generally Y-shaped vane member 60 is radially disposed in each recess and includes a side 61 leading and a side 63 following in the direction of rotation of the rotor. The sides of the vane are in slideable sealing relationship with the sides of the recess. Each vane 60 has an enlarged portion 62 at its radially inner end, in the form of projecting members 64, 66 which extend laterally in opposite directions from opposite sides 61, 63 of the vane 60. As is shown in FIGURE 7, enlarged portion 62' of vane 60' may take the form of a single projecting member 65' extending laterally from one side of the vane with enlarged chamber 58' being shaped accordingly. Projecting members 64, 66 (FIGURE 3) are in slideable, sealing relation with the side walls of the chamber 58, and the radial dimension of the projecting members is less than the radial dimension of chamber 58, to permit reciprocation of the vane 60. The greater the difference between the radial dimension of the enlarged portion of the vanes and the radial dimension of chamber 58, the greater will be the volume available for charge intake, and consequently the greater the order of compression that will be achieved.

A plurality of elongated sealing strips 68 are received in longitudinally extending elongated slots 70, which are formed in the radially outer ends of the vanes 60. Spring members 72 are disposed in the slots beneath the strips 68 (see FIGURE 4). Strips 68 are urged outwardly by the springs 72 to make slideable sealing engagement with the peripheral wall 16 of housing 10, and divide the working space between the housing and the rotor into a plurality of working chambers 74, arranged circumferentially around the rotor.

A plurality of passageways 76 (see also FIGURE 5) are formed in sets of four in rotor 24, although more or fewer passageways could be provided in a set. At least one passageway per set is a requisite. Each set of passageways 76 communicates between the inner end of a recess 56 and the working chamber 74 which is adjacent the side 63 of the vane 60 in that recess. Passageways 76 open into the recess adjacent the inner wall of enlarged chamber 58, and equalize the pressure at each end of the vane 60. This prevents formation of high pressure differentials radially across the vanes so that high pressures incident to firing will not overcome the centrifugal force which forces the vanes radially outwardly into sealing relation with the housing. High firing pressures overcoming centrifugal force and urging the vanes radially inwardly out of sealing relation with the housing is a source of gas leakage between adjacent working chambers. Further, passageways 76 permit the intake of charge into the radially inner ends of recesses 56 to increase the compression ratio of the engine.

Sealing plate members 78, 80 (FIGURE 4), which are respectively attached to end walls 28, 30 of rotor 24 seal the ends of working chambers 74 from one another from gas leakage around the ends of the vanes and the rotor. The sealing plates include radially outer peripheral portions 79, 81 which respectively are in rotatable, sealing relationship with the housing end walls 12, 14 adjacent the peripheral surface 32 of rotor 24. The sealing plate members extend radially inwardly, forming end closures for recesses 56, and include recessed portions 82, 84 which are spaced from the housing end walls. The spaces between the recessed portions 82, 84 and the housing end walls communicate with the atmosphere through orifices 86 (see also FIGURE 2) which are formed in the housing end walls 12, 14. A plurality of upstanding ears 88 are formed in the outer periphery of each sealing plate, and the ends of sealing strips 68 are sealably received in radially extending slots 90 formed in the sealing plates between the ears. The slots are spaced circumferentially around the sealing plates in accordance with the spacing of the sealing strips.

A plurality of vent passages 92 (FIGURES 2, 4) are formed in the sealing plate members, communicating the spaces between the recessed portions 82, 84 of the sealing plates and the respective housing end walls, with the radially inner end of each recess 56. Each vent passage 92 opens into an enlarged chamber 58 adjacent the radially outer wall thereof, to prevent entrapment and compression of gas between the laterally extending projecting members 64, 66 and the radially outer wall of enlarged chamber 58. Such compression would act against the centrifugal force which maintains the vanes in sealed engagement with the peripheral housing wall 16.

A roller bearing 94 is carried by the radially outer end of each vane 60, extending longitudinally relative to the vane and having a peripheral surface in rotatable sealed engagement with the radially outer end of the vane. A lubricant passage 96 is formed in each vane 60, extending longitudinally through the vane and communicating with a plurality of lubricant ports 98 which extend radially outwardly from lubricant passage 96 and open against the radially inner surface of bearing 94 to lubricate the bearing.

Radially extending slots 100, 102 (see also FIGURE 6) are formed in side 61 of each vane 60 at opposite end portions of the vane. A lubricant supply passage 104 is formed in rotor 24, communicating between slot 100 and an annular recess 106 in shaft 18. Oil is supplied to recess 106 from a crankcase schematically illustrated at 108 by an oil pump 110, which may be driven by a take-off from shaft 18 in any suitable, conventional fashion. Pump 110 delivers oil to recess 106 through supply pipe 112, annular chamber 114 formed in shaft 18 and bearing 22, and passage 116 which communicates through shaft 18 between chamber 114 and recess 106. Oil is continuously delivered to slot 100 and thus also to lubricant passage 96 notwithstanding reciprocation of vane 60, because passage 96 is in continuous communication with slot 100.

Thus, bearing 94 is continuously lubricated, and further, vane 60 is continuously cooled by the lubricant flowing in passage 96. Oil in passage 96 which is not bled through a port 98 emerges from the vane opposite slot 102 in rotor 24, and is conducted through passage 118 formed in rotor 24. Passage 118 conducts oil to annular recess 120 in shaft 18, from which the oil is passed through passage 122 in shaft 18 to annular chamber 124 formed in bearing 20 and shaft 18. Oil is withdrawn from chamber 124 by withdrawal pipe 126, which discharges the oil into crankcase 108 for cooling by water flowing in coil 128, and recirculation by pump 110.

In operation, shaft 18 is rotated by any suitable external power source, and a charge mixture of fuel and oxygen-containing gas such as air is passed into intake manifold 38 and through intake slots 130 into the working space. The volume of the working space progressively increases in intake region 48, and the vanes 60 are urged outwardly by centrifugal force from a position seated against the inner wall of the recess, which they occupy at entry into the intake region. The charge is drawn into the working chambers, and through passageways 76 into enlarged chambers 58 at the inner ends of recesses 56, and the vanes pass into compression region 50. As the volume of the working space progressively decreases in the compression region the charge is compressed between the surface of the rotor and the housing. Further, the housing wall 16 forces vanes 60 radially inwardly, compressing the charge in the enlarged chambers 58 and forcing it through passageways 76 into the working chambers, so that an extraordinarily high order of compression is achieved in the compression portion of the cycle. Each vane 60 follows a next preceding vane in the direction of rotation of the rotor. Considering for example, vanes 60a, 60b, 60c, upon rotation of vane 60b to igniting device 55, as shown in FIGURE 3, the following vane 60c is seated on the inner end of its recess by the configuration of the surface of housing wall 16 at that location. Further, this surface of the housing wall maintains vane 60c seated on the inner end of the recess through rotation of the vane to igniting device 55, just as vane 60b was seated against the inner end of its recess upon rotation of next preceding vane 60a to igniting device 55 momentarily earlier in the cycle, and was maintained seated until rotated to the position illustrated. While the vanes are seated, the sealing strips 68 are urged radially inwardly, springs 72 yielding to accommodate variation in spacing between the housing wall 16 and the rotor surface in the area approaching igniting device 55.

When vane 60b is rotated to igniting device 55, compressed charge in the working chamber 74b between seated vanes 60b and 60c is fired. The housing wall 16 recedes from the rotor surface as vane 60b proceeds into combustion region 52, the volume of the working space increasing and the expanding products of combustion acting on vane 60b to rotate the rotor, centrifugal force moving the vane radially outwardly to maintain sealing engagement with housing wall 16. The pressure in the working chamber between vanes 60b and 60c, and in enlarged chamber 58 below vane 60b, is equalized by virtue of their communication by passageways 76. Thus upon firing, there is no high pressure differential across the inner and outer ends of vane 60b to overcome the action of centrifugal force in maintaining the vane in sealing relation to the housing and leakage between working chamber 74b and next preceding working chamber 74a from this source is prevented. Further, no leakage can occur into next following working chamber 74c, because vane 60c is seated against the inner end of its recess and thus cannot be driven radially inwardly out of sealing relation with the housing wall. Sealing strips 68 are not subject to radially applied pressure from firing as are the vanes, and springs 72 can readily maintain the strips in sealing relation with the housing.

As vane 60b continues into combustion region 52, the pressure in working chamber 74b at all times is equal to that at the inner end of vane 60b, so that leakage into preceding chamber 74a can never occur. It will thus be observed that the problem of peripheral leakage between adjacent working chambers has been overcome without resort to complex mechanisms internal to the rotor, and that the problem of leakage around the ends of the vanes has been overcome by the unique sealing plate arrangement discussed hereinabove.

As the vanes rotate into exhaust region 54, products of combustion are removed through exhaust slots 134, formed in housing 10 in the exhaust region. The volume of the working space progressively decreases in this region, the vanes 60 being moved radially inwardly to drive burned gases from the enlarged chambers 58 for exhaust through passageways 76. When this has been completed, the vanes are again seated against the radially inner ends of their respective recesses, and again enter the intake portion of the cycle.

Rotary combustion engines according to the invention can burn gasoline or other highly volatile liquid fuel, natural gas, or diesel oil. When gasoline or the like is used, igniting device 55 takes the form of a spark plug. When burning natural gas, a glow plug is used to ignite the charge. When diesel fuel is burned, igniting device 55 is replaced by a fuel injector, and only oxidizing gas is taken in during the intake portion of the cycle.

Although the invention has been described in connection with a preferred embodiment, modification is of the illustrated embodiment can be made without departing from the spirit of the invention. Such modifications are considered to be within the scope of the invention as defined by the appended claims.

I claim:

1. A rotary internal combustion engine, comprising a stationary housing having opposing end walls and a peripheral side wall,
a shaft rotatably mounted in the end walls of the housing,
a rotor fixedly associated with the shaft and having a peripheral side surface opposing the side wall of the housing,
the peripheral surface of the rotor and the housing defining a working space having a volume varying peripherally about the rotor,
means for passing charge into the working space,
an igniting device carried by the housing,
the rotor including means defining a plurality of recess extending radially inwardly from the peripheral surface of the rotor, each recess having a radially inner end and opposing sides,
a vane member received in each recess and having opposite sides in radially slideable sealed relationship with the sides of the recess,
the vane members including first sealing means slideably, sealably engaging the peripheral wall of the housing,
the vane members dividing the working space into a plurality of working chambers having ends adjacent the end walls of the housing,
the rotor also including means defining a plurality of passageways, each passageway extending from the radially inner end of a recess to a working chamber on one side of the vane member in the recess, and
second sealing means for sealing the ends of the working chambers,
each recess including an enlarged charge-receiving chamber at the radially inner end of the recess,
each enlarged chamber having an inner wall, side walls, and an outer wall spaced radially from the inner wall,
each passageway opening into a recess adjacent the inner wall of the enlarged chamber,
the vane member having a radially inner end and an enlarged portion at the inner end, the enlarged portion being in radially slideable sealed relationship with the side walls of the enlarged chamber.

2. The rotary internal combustion engine of claim 1, including
means forming vent passages opening into each enlarged chamber adjacent the outer wall, and
means communicating the vent passages with atmosphere.

3. The rotary internal combustion engine of claim 13,
the working space including an intake region, a compression region, a combustion region and an exhaust region serially disposed around the peripheral surface of the rotor,
the igniting device being located at the junction of the compression region and the combustion region,
each vane member following a next preceding vane member in the direction of rotation of the rotor,
the opposite sides of each vane member including a first side leading and a second side following in the direction of rotation of the rotor,
each passageway opening into the working chamber adjacent the second side of the vane member,
the peripheral side wall of the housing including means for seating a following vane member on the inner end of the recess upon rotation of the next preceding vane member to the igniting device, and maintaining the following vane member seated on the inner end of the recess through rotation of the following vane member to the igniting device.

4. The rotary internal combustion engine of claim 1, the vane members including radially outer ends and means defining longitudinally extending elongated slots in the outer ends.
the first sealing means including a plurality of elongated sealing strips received in the slots,
and spring means disposed in the slots for urging the sealing strips radially outwardly.

5. The rotary internal combustion engine of claim 1, the rotor being concentrically disposed relative to the housing and having a generally circular configuration,
the stationary housing having a generally elliptical configuration.

6. The rotary internal combustion engine of claim 1, the enlarged portion of each vane member including a projecting member extending laterally from one side of the vane member.

7. The rotary internal combustion engine of claim 1, the enlarged portion of each vane member including projecting members extending in opposite directions laterally from opposite sides of the vane member.

8. The rotary internal combustion engine of claim 1, the first sealing means including a plurality of longitudinally extending elongated sealing strips having ends adjacent the housing end walls,
the rotor having end walls opposing the end walls of the housing,
the second sealing means including a sealing plate member associated with each end wall of the rotor and including a radially outer peripheral portion adjacent the peripheral surface of the rotor and in rotatable sealed relationship with an end wall of the housing,
the sealing plate members including means defining a plurality of radially extending slots in the radially outer peripheral portions,
the ends of the sealing strips being sealably received in the slots in the sealing plate members.

9. The rotary internal combustion engine of claim 8, the sealing plate members extending radially inwardly and forming end closures of the recesses, at least one sealing plate member having a recessed portion,
the recessed portion and the housing end wall defining a venting space,
the sealing plate members including means forming vent passages opening into each enlarged chamber adjacent the outer wall and communicating with the venting space,
the end wall of the housing including means communicating between the venting space and the atmosphere.

10. The rotary internal combustion engine of claim 1, each vane member including a radially outer end,
a longitudinally extending roller bearing carried by the radially outer end of each vane member and having a radially inner surface rotatably sealably engaging the radially outer end of the vane member,
each vane member also including
opposite end portions adjacent the end walls of the housing,
means defining a lubricant passage extending longitudinally between the end portions of the vane member,
means defining a plurality of ports extending radially outwardly from the lubricant passage and opening against the radially inner surface of the roller bearing,
means defining a first radially extending slot in a side of the vane member at one end portion of the vane member, and
means defining a second radially extending slot in a side of the vane member at the other end portion of the vane member,
the lubricant passage communicating with the first and second slots, and
the rotor including
means forming a lubricant supply passageway communicating with the first slot, and
means forming a lubricant withdrawal passageway communicating with the second slot.

11. A rotary internal combustion engine, comprising a stationary housing having opposing end walls and a peripheral side wall,
a shaft rotatably mounted in the end walls of the housing,
a rotor fixedly associated with the shaft and having a peripheral side surface opposing the side wall of the housing,
the peripheral surface of the rotor and the housing defining a working space having a volume varying peripherally about the rotor,
the rotor including means defiing a plurality of recesses extending radially inwardly from the peripheral surface of the rotor, each recess having a radially inner end and opposing sides,
a vane member received in each recess and having opposite first and second sides in radially slideable sealed relationship with the sides of the recess,
the first side leading and the second side following in the direction of rotation of the rotor,
the vane members including first sealing means slideably, sealably engaging the peripheral wall of the housing,
the vane members dividing the working space into a plurality of working chambers having ends adjacent the end walls of the housing,
the rotor also including means defining a plurality of passageways, each passageway extending from the radially inner end of a recess to the working chamber on the second side of the vane member in the recess,
second sealing means for sealing the ends of the working chambers,
an igniting device carried by the housing,
the working space including an intake region, a compression region, a combustion region and an exhaust region serially disposed around the peripheral surface of the rotor,
the igniting device being located at the junction of the compression region and the combustion region,
each vane member following a next preceding vane member in the direction of rotation of the rotor, and
the peripheral side wall of the housing including means for seating a following vane member on the inner end of the recess upon rotation of the next preceding vane member to the igniting device, and maintaining the following vane member seated on the inner end of the recess through rotation of the following vane member to the igniting device.

References Cited

UNITED STATES PATENTS

| | | | |
|---|---|---|---|
| 1,819,867 | 8/1931 | Carlton | 91—135 X |
| 2,880,045 | 3/1959 | Wankel | 91—135 X |
| 2,899,940 | 8/1959 | Gibbs et al. | 91—138 |
| 3,014,431 | 12/1961 | Van Den Bussche | 103—136 |
| 3,103,920 | 9/1963 | Georges | 123—16 |
| 3,300,127 | 1/1967 | Yamamoto et al. | 123—8 X |

FOREIGN PATENTS 794,773    5/1958    Great Britain.

ROBERT A. O'LEARY, Primary Examiner.

WILLIAM E. WAYNER, Assistant Examiner.

U.S. Cl. X.R.

91—123, 138; 230—152

UNITED STATES PATENT OFFICE

CERTIFICATE OF CORRECTION

Patent No. 3,450,108　　　　　　　　　Dated June 17, 1969

Joe G. Rich

It is certified that errors appear in the above-identified patent and that said Letters Patent are hereby corrected as shown below:

Col. 1, line 12, "drive" should be -- divide --.
Col. 2, line 14, "1" should be -- 4 --.
Col. 5, line 75, "recess" should be -- recesses --.
Col. 6, line 36, "13" should be -- 1 --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents